(12) United States Patent
Steinhaus et al.

(10) Patent No.: US 12,407,152 B2
(45) Date of Patent: Sep. 2, 2025

(54) REPAIR AND REPLACEMENT OF HIGH VOLTAGE CABLES AND JOINTS

(71) Applicant: Brugg Kabel AG, Brugg (CH)

(72) Inventors: Ronny Steinhaus, Herznach (CH); Michael Junghans, Villigen (CH); Willibald Nägele, Wutöschingen (DE); Simon Eberhart, Bätterkinden (CH); Omar Abbara, Toronto (CA)

(73) Assignee: BRUGG KABEL AG, Brugg (CH)

( * ) Notice: Subject to any disclaimer, the term of this patent is extended or adjusted under 35 U.S.C. 154(b) by 661 days.

(21) Appl. No.: 17/607,561

(22) PCT Filed: Apr. 30, 2020

(86) PCT No.: PCT/EP2020/062139
§ 371 (c)(1),
(2) Date: Oct. 29, 2021

(87) PCT Pub. No.: WO2020/221897
PCT Pub. Date: Nov. 5, 2020

(65) Prior Publication Data
US 2022/0224088 A1 Jul. 14, 2022

(30) Foreign Application Priority Data
May 1, 2019 (CH) .......................................... 575/19

(51) Int. Cl.
*H02G 1/14* (2006.01)
*H02G 15/105* (2006.01)

(52) U.S. Cl.
CPC ............. *H02G 1/14* (2013.01); *H02G 15/105* (2013.01)

(58) Field of Classification Search
CPC ....................................................... H02G 1/14
See application file for complete search history.

(56) References Cited

U.S. PATENT DOCUMENTS 3,424,853 A * 1/1969 Johnson ............... H02G 15/085
285/248
4,383,131 A 5/1983 Clabburn
(Continued)

FOREIGN PATENT DOCUMENTS

AU          645495 B2      1/1994
CN       204167521 U       2/2015
(Continued)

OTHER PUBLICATIONS

Brugg Cables, "Brugg Cables High Voltage Accessories. Swiss solutions for independent applications", Nov. 4, 2010, XP055609192, total 4 pages.
(Continued)

*Primary Examiner* — Chau N Nguyen
(74) *Attorney, Agent, or Firm* — Birch, Stewart, Kolasch & Birch, LLP (57) ABSTRACT

A method of repairing or replacing a joint for high voltage polymer cables or a high voltage polymer cable (1c), comprises the steps of: a) removing a section to be replaced of the joint or the high voltage polymer cable (1c) such that two cable ends (1a, 1b) result, whereby the two cable ends (1a, 1b) are oriented toward each other and whereby the two cable ends (1a, 1b) are positioned in a separation distance (20) from each other and whereby each cable end (1a, 1b) comprises a cable conductor (10a, 10b), b) preparing the two cable ends (1a, 1b) by exposing the cable conductors (10a, 10b) of both cable ends (1a, 1b) over a first length c) connecting the two cable conductors (10a, 10b) with a connection piece (3) which comprises two receiving sections (31a, 31b) and a centre section (30) and which is electrically conducting, whereby a length of the centre section (30d) corresponds to the separation distance (20) and whereby the cable conductors (10a, 10b) are mounted in such a way to (Continued)

the receiving sections (31*a*, 31*b*) that a mechanical and an electrically conducting connection is established.

3 Claims, 6 Drawing Sheets

(56) References Cited

U.S. PATENT DOCUMENTS

| | | | | |
|---|---|---|---|---|
| 4,756,465 | A * | 7/1988 | Pranch | B23K 20/129 |
| | | | | 228/115 |
| 5,286,952 | A * | 2/1994 | McMills | B29C 66/71 |
| | | | | 285/21.2 |
| 8,424,924 | B2 * | 4/2013 | LaMarca | B29C 66/1122 |
| | | | | 285/285.1 |
| 9,601,914 | B2 * | 3/2017 | Chiu | H02G 15/007 |
| 10,618,477 | B2 * | 4/2020 | Hagi | H01B 7/18 |
| 11,577,176 | B2 * | 2/2023 | Ye | A63H 33/102 |
| 2010/0319990 | A1 * | 12/2010 | Gumley | H01R 4/206 |
| | | | | 174/84 C |
| 2014/0000110 | A1 | 1/2014 | Stauch et al. | |
| 2017/0250531 | A1 | 8/2017 | Corsaro | |

FOREIGN PATENT DOCUMENTS

| | | |
|---|---|---|
| DE | 202014103232 U1 | 3/2015 |
| EP | 0920101 A1 * | 6/1999 |
| GB | 2328802 A | 3/1999 |
| WO | WO 2016/143695 A1 | 9/2016 |

OTHER PUBLICATIONS

United Arab Emirates Office Action and Search Report for United Arab Emirates Application No. P6001981/2021, dated Oct. 10, 2024.

* cited by examiner

REPAIR AND REPLACEMENT OF HIGH VOLTAGE CABLES AND JOINTS

The invention relates to a method for repairing or replacing high voltage devices like high voltage polymer cables and joints for connecting high voltage polymer cables.

High voltage devices can have defects, resulting in a faulty high voltage polymer cable or a faulty joint which need to be repaired. High voltage devices, especially high voltage joints, need to be replaced once they reached a certain age. Sometimes, changes in the environment, damages on protection layers and others increase the risk of defects locally and make a replacement of high voltage devices or parts of it necessary. The method according to the invention is especially well suited for repairing defects in high voltage polymer cables and joints. However, it can also be used for replacement of high voltage devices with a high risk of failure, like joints having a high age or cables with outer mechanical damages.

For example, small and local faults in the insulation or in the layering of a high voltage cable may cause discharges which destroy the cable locally. There are also cases where discharges occur inside existing joints. Such discharges create defects and make the high voltage polymer cable or the joint faulty. Other common causes for defects are mechanical damages for example caused by excavator works.

Because of their massive homogeneous insulation sheath, high voltage polymer cable have a much greater stiffness compared to oil-filled cable for the same voltage range. Once installed, high voltage polymer cables cannot be moved easily. Therefore, if a section to be replaced is removed, simply pulling the ends of the remaining cable together is in general not possible. The separation distance between the cable ends is essentially fixed and given and can only be increased by removing more of the cable but it cannot be decreased.

In the prior art, faulty sections of high voltage installations are therefore repaired by removing the faulty section together with a significant length of intact cable and replacing it with a piece of high voltage polymer cable. The high voltage polymer cable is connected with known joints on both of its ends to the cable ends which remained of the original cable to be repaired. However, joints cannot be placed in the immediate vicinity of each other. Therefore, the removed and replaced part of the cable is general significantly larger than the faulty section. For example, the faulty section may have a length of about 10 cm, but the removed section according to the prior art has a length of 10 m or more. Also, it may be difficult to find a suitable piece of a high voltage cable for the replacement: High voltage polymer cables are often custom-made, requiring also a custom-made cable piece for the replacement. Further, high voltage polymer cables are often placed underground. Therefore replacing a long piece of cable involves opening the ground over a long distance which is costly and takes time.

From the AU 645 495 B2 (N K F Kabel) it is known to connect conductors of high voltage cables with curved connections in order to avoid space-requiring cable bends and to use high voltage cable in limited spaces.

It is the object of the invention to create a method for repairing or replacing high voltage devices like high voltage polymer cables and joints to connect high voltage polymer cables pertaining to the technical field initially mentioned.

The solution of the invention is specified by the features of claim 1. According to the invention the method of repairing or replacing a joint for high voltage polymer cables or a high voltage polymer cable, comprising the following steps:

The section to be replaced of the joint or the section to be replaced of the high voltage polymer cable is removed. This results in two cable ends which are oriented toward each other. The two cable ends are positioned in a separation distance from each other. Each cable end comprises a cable conductor.

The two cable ends are prepared by exposing the cable conductors of both cables over a first length.

The two cable conductors are connected with a connection piece. The connection piece comprises two receiving sections and a centre section. The connection piece is electrically conducting.

The length of the centre section corresponds to the separation distance. The cable conductors are mounted in such a way to the receiving sections that a mechanical and an electrically conducting connection is established.

The connected connection piece establishes thereby a mechanical and electrically conducting connection between the two cable conductors.

The basic idea of the invention is to replace the section to be replaced of the joint or the high voltage polymer cable by a repair joint instead of the set of two common joints and a piece of high voltage polymer cable as done in the prior art. This repair joint is preferably longer than a common joint. The distance between the cable conductors is, according to the invention, bridged by the connection piece and not by a piece of high voltage polymer cable. A second joint can be avoided. There is consequently no requirement to remove a certain length of the cable only to ensure a minimum distance between joints. The length of the cable affected by the repair or replacement is, with the method according to the invention, therefore reduced to essentially the section to be replaced and its immediate vicinity, only. Further, joints have a higher risk of failure compared to a cable section. Reducing the number of joints, from two common ones to one repair joint, increases therefore the reliability.

Further, there is no need to provide a piece of a suitable high voltage polymer cable. This avoids all problems and costs associated with organising, producing and installing such a replacement cable piece.

High voltage polymer cables are cables insulated with a plastic, for example PE, XLPE or EPR, and which are suitable for rated voltages of more than 1 kV, preferably for rated voltages between 6 kV and 500 kV. A high voltage polymer cable comprises a conductor and the following layers, listed from the inside to the outside: An inner semiconducting layer, an insulating layer, an outer semiconducting layer, an optional metal sheath and an outer jacket. There can be further layers depending on the specific needs.

The outer jacket is a mechanical protection of the cable. The metal sheath, preferably made of lead, is a radial water barrier. The outer semiconducting layer is grounded and restricts thereby the electric field inside it. There is in general an electrical contact between the outer semiconducting layer and the metal sheath, for example by semiconducting tapes and/or a net of copper wires arranged between these two layers or by direct contact. The outer semiconducting layer is in direct contact with the insulating layer. The insulating layer insulates the cable conductor electrically from its environment. The inner semiconducting layer is on the same electric potential as the conductor and in direct contact to the insulating layer. The inner semiconducting layer avoids voids in the boundary between the high electric potential region and the insulating layer. The conductor conducts the current transmitted by the cable during operation.

Preferably the connection piece is made of copper or a copper alloy.

The section to be replaced reaches preferably from 5 cm or more before the first end of the first defect to 5 cm or more behind the last end of the last defect in a high voltage device. The section to be replaced may comprise a group of defects or only a single defect. Preferably, the length of a section to be replaced is smaller than 5 meters.

In one embodiment, the method comprises further the following steps:

At each of the two cable ends, the insulating layer and the outer semiconducting layer is exposed. The outer semiconducting layer surrounds the insulating layer of the cable end.

Preferably, the connection piece is surrounded with a filling which is electrically conductive or semiconductive. Preferably, the filling comprises a filling tube which is made of metal, preferably made of aluminium and which has an outer diameter equal to the outer diameter of the insulating layer of the two cable ends and which has a length equal to the distance between the insulating layers of the two cable ends.

A stress control body comprising two deflectors and a shield electrode is placed around the cable ends connected with the connection piece. It is placed in such a way that each of the two deflectors contacts a different one of the exposed outer semiconducting layers. The length of the shield electrode is greater than the length of the connection piece such that the shield electrode touches the insulating layer of both cable ends and surrounds the connection piece completely. This position of the stress control body is called operating position.

The shield electrode will be on the electric potential of the conductor during operation. The shield electrode acts therefore essentially as faraday cage for the connection piece and creates in its inside a field free space. This allows the presence of small voids between the connection piece and the shield electrode.

In one preferred embodiment, the shield electrode is electrically connected to the conductor by a filling. The filling is an electrical conductor or a semiconductor surrounding the connection piece and potentially parts of the conductors which are neither covered by the insulating layer nor by the connection piece. In one embodiment, the filling is or comprises an electrically conducting or semiconducting filling tape wrapped around the connection piece or an elastic conducting or semiconducting sleeve placed around and on the connection piece. In one embodiment, an electrically conducting filling tape is a tinned copper braid. In one embodiment, the filling comprises a filling tube. Such a filling tube is made of a metal, preferably it is made of aluminium. The outer diameter of the filling tube equals the outer diameter of the insulating layer of the cable ends. The length of the filling tube equals the distance between the insulating layers of the cable ends. Therefore, the filling tube continues the outer shape of the insulating layers such that edges and changes in the outer diameter of the connected cable ends are avoided. This facilitates a correct seat and avoids deformation of the stress control body and increases thereby the reliability of the repair joint. In one embodiment, the filling tube is made of two parts which are both of the shape of a cylinder cut in its middle along its longitudinal axis. The two parts of the filling tube comprise preferably aligning or coupling means with which a lateral movement of the two parts relative to each other is prevented if they are in such a position relative to each other that they form a tube.

One example for such aligning means is a tongue and groove system. In one embodiment, the filling comprises electrically semiconducting filling tape wrapped around the parts of the conductors which are neither covered by the insulating layer nor by the connection piece, electrically conducing filling tape wrapped around the connection piece and a filling tube in direct contact to both filling tapes. Besides proving mechanical support, a filling tube ensures an electrical contact between the conductor and the shield electrode.

In another embodiment, the shield electrode is electrically connected to the conductor by a wire or a braid which one end is connected to a conductor of one of the cable ends or to the connector and which other end is connected to the shield electrode.

The deflectors are on ground potential due to the contact with the outer semiconducting layer of the two cable ends.

Therefore the electric field can be controlled by the shape and the dimensions of the stress control body and the electrodes on its inside.

Preferably, the stress control body is made of elastomeric silicone whereby the shield electrode and the deflectors are regions enriched with carbon black or similar particles to make them electrically semiconducting regions surrounded by electrically insulating regions.

In one embodiment, the shield electrode is homogeneously semiconducting. This embodiment has the advantage of resulting in a well-defined electric field and minimizes the requirements in arranging the shield electrode. A homogeneously semiconducting shield electrode is for example made of elastomeric silicone which comprises everywhere the same density of carbon black particles.

In one embodiment, the shield electrode consists of two or more regions which are homogeneously semiconducting and which are separated by small regions with different conductivity, preferably the small regions are insulating. In addition, in this embodiment, the semiconducting regions are arranged in such a way that all of them are on the same electric potential. For example, they are all arranged in such a way that each of the semiconducting regions contacts the connection piece or they are connected by a conductor, such as a metal wire. In the following, the term "inhomogeneous shield electrode" refers to a shield electrode which comprises more than one homogeneously semiconducting region which are all one the same electric potential when in use.

The distances between the homogeneously semiconducting regions in an inhomogeneous shield electrode are preferably smaller than 10 mm. The distances may be larger if simulations of the actual situation of the repair joint, including the chosen geometry, the materials and/or the voltages in the cable to be repaired, indicate that a suitably electric field results.

The shape of the inhomogeneous shield electrode is preferable the convex hull of its homogeneously semiconducting regions.

Preferably, an inhomogeneous shield electrode is made of elastomeric silicone and the homogeneously semiconducting regions are enriched with carbon black or similar particles to become semiconducting.

It was found that the electric field outside of the inhomogeneous shield electrode is similar to the electric field outside of a homogeneous shield electrode and that therefore an inhomogeneous shield electrode can replace a homogeneous shield electrode in the repair joint and vice versa.

In a preferred embodiment, the inhomogeneous shield electrode comprises at least two homogeneous shield electrodes having the shape of tubes with rounded edges. The homogeneous shield electrodes form homogeneously semiconducting regions. In this embodiment, the diameter of these tubes forming the homogeneous shield electrodes are the same. These homogeneous shield electrodes are arranged along a common longitudinal axis, whereby the distance between closest points of subsequent homogeneous shield electrodes is preferably smaller than 10 mm. This embodiment has the advantage that prefabricated homogeneous shield electrodes of a given length can be used to form a shield electrode fulfilling the length requirement for a shield electrode for a stress control body according to the invention.

The use of a stress control body with a shield electrode having a length adapted to length of the connector has the advantage of minimizing the space requirements for the repair or replacement and the resulting repair joint.

In one embodiment, the method according to the invention comprises further the following steps:

A prefabricated stress control body comprising two deflectors and a shield electrode is provided.

The insulating layer of a first cable end is exposed for a length which essentially equals the distance between a contact region of the deflector and a contact region of the shield electrode of the prefabricated stress control body. The insulating layer of a second cable end is exposed for a length which essentially equals the distance between a contact region of the deflector and a contact region of the shield electrode of the prefabricated stress control body.

The outer semiconducting layer of the first cable end is exposed over such a length, that the sum of the lengths of the exposed outer semiconducting layer of the first cable end and the exposed insulating layer of the first cable end is greater or equal to the length of the prefabricated stress control body.

The outer semiconducting layer of the second cable end is exposed for a length greater than the extent of the contact region of the deflector.

A prefabricated stress control body is slipped onto the first cable end. This position is called parking position in the following.

After the step of slipping the prefabricated stress control body onto the first cable end, the two cable conductors are connected with the connection piece.

A filling, which is electrically conducting or semiconducting, is placed around the connection piece. The outer diameter of the filling is essentially constant equal to the outer diameter of the insulating layer of the two cable ends.

After the placement of the filling, the prefabricated stress control body is slipped in a position where the contact region of each of the deflectors is located onto a different one of the outer semiconducting layers and where the shield electrode surrounds the connection piece and the filling and where the shield electrode is partially located onto both of the insulating layers. The prefabricated stress control body is now in the operating position.

This embodiment has the advantage that a prefabricated stress control body can be used. The use of a prefabricated stress control body increases the reliability as the stress control body can be tested prior to installation and it increases the speed of the installation on site.

The filling can comprise the filling tapes and/or the filling tube as described above.

The prefabricated stress control body is preferably made of elastomeric silicone rubber. The duct of the prefabricated stress control body has a diameter which is slightly smaller than the outer diameter of the insulating layers of the cable ends. Due to the elastomeric properties, the prefabricated stress control body is pressed against the insulating layers of the cable which avoids voids on the boundary between insulating layers and stress control body which can cause failures like electrical discharges. Further, due to its elastomeric properties, the prefabricated stress control body can be used for repairing or replacing high voltage polymer cables of different diameters and joints which were used with high voltage polymer cables of different diameter.

In another embodiment, the stress control body is casted on site onto the cable ends connected with the connection piece. One possible cast material is silicone rubber. In this embodiment, the deflectors and the shield electrode are preferably prefabricated. This embodiment has the advantage that the semiconducting layer of the first cable only needs to be exposed for a length of essentially the extent of the contact region on the deflector. This allows an even more space-saving repair or replacement.

In one embodiment, the stress control body is casted on site onto the cable ends connected with the connection piece. One possible cast material is silicone rubber. In this embodiment, the deflectors and the semiconducting regions of an inhomogeneous shield electrode are prefabricated. In this embodiment, the deflectors and the semiconducting regions are arranged in the desired distances to each other on the prepared cable ends respectively around the connection piece before the cast material is filled in. This allows an even more space-saving repair or replacement and the use of prefabricated homogeneous shield electrodes which are, by itself, shorter than the shield electrode needed for the repair joint at hand. This embodiment uses an inhomogeneous shield electrode.

In another embodiment, the semiconducting layer of the first cable is only exposed for a length of essentially the extent of the contact region of the deflector and the stress control body is slipped onto the outer jacket of the first cable. This embodiment allows an even more space-saving repair or replacement.

The contact region of the deflector is the region in which the electrically semiconducting material of the deflector is not covered by the electrically insulating material which surrounds most of the deflector in the stress control body. Further the contact region of the deflector is a region located inside the duct of the stress control body. Therefore, the contact region is the region of the deflector which can contact the outer semiconducting layer of the cable end on which the deflector is placed.

The contact region of the shield electrode is the region in which the electrically semiconducting material of the shield electrode is not covered by the electrically insulating material which surrounds the shield electrode otherwise in the stress control body. Further the contact region of the shield electrode is a region located inside the duct of the stress control body.

The distance between the contact region of the shield electrode and the contact region of the deflector is preferably the distance between the beginning of the contact region of the deflector and the beginning of the contact region of the shield electrode whereby the beginning is determined when entering the stress control body from the outside to its center.

In one embodiment, the method comprises further the following steps:

At each of the two cable ends, the metal sheath is exposed.

A casing, preferably mainly made of copper or a copper alloy, is placed around the stress control body covering the connection piece.

The casing is connected in a fluid-tight and electrically conducting, way to the metal sheath of both cable ends.

Preferably, the casing connected by a seal made by soldering to the metal sheath of both cable ends.

The metal sheath of the cables is a radial water barrier. Further, the metal sheath is on ground potential and acts as grounding contact for the outer semiconducting layer of the cable.

The casing continues the radial water barrier. Further, the casing is a convenient place to connect the metal sheaths of the cables to an external ground or to connect the metal sheaths of the two connected cable ends with each other.

In other embodiments, the radial water barrier is realized with a casing made of a plastic or resin or by a cast material surrounding the stress control body. In other embodiments, wires or braids are directly contacted to or formed out of the metal sheaths of the cable ends and these wires or braids are either connected with each other or connected to an external ground. In other embodiments, a radial water barrier is omitted.

Preferably, the soldered seal comprises lead and soldering tin which both establish a mechanical and electrical connection between the metal sheath and the casing. By adjusting the amount of lead, possible distances between the metal sheath and the casing can be bridged and thereby a given casing can be used for high voltage polymer cables of different diameter and joints connecting them. The seal can be wrapped with reinforcement tape in order to protect the seal against mechanical load and to support the water-tightness.

In one embodiment, where there is a casing, the casing comprises two casing parts. The casing parts are made of metal, preferably of copper or a copper alloy. The casing comprises further a casing tube made of electrically insulating material, preferably a plastic and especially a combination of a PVC tube and insulating tape.

In one embodiment, the casing tube is made of Polyoxymethylene, preferably POM-C. It was found that the use of this plastic results in repair joints which are mechanically particularly stable.

Both casing parts have a first opening and a second opening. The diameter of the first opening is essentially equal to the diameter of the metal sheath of the cable ends. The diameter of the second opening is greater than the greatest diameter of the stress control body.

The casing tube has an inner diameter greater than the greatest diameter of the stress control body and an outer diameter greater than the second opening of the two casing parts.

In this embodiment, the method comprises the following steps:

One casing part is placed on each of the cable ends before the stress control body is placed anywhere on one of the cable ends. The casing parts are placed on the cable ends before the stress control body is placed in its parking position or in its operating position.

At least parts of the casing tube are placed on one of the cable ends before the two cable conductors are connected with the connection piece.

After placing the stress control body in a position where the contact region of each deflector is located on a different one of the outer semiconducting layers and where the shield electrode surrounds the connection piece, the two casing parts and the casing tube are pushed together. They are brought together such that both casing parts contact the casing tube on different ends of the casing tube. The casing parts and the casing tube are brought together after the stress control body is in its operating position.

The two casing parts are connected to the different ends of the casing tube in a fluid-tight way. Preferably, the casing parts and the casing tube are connected by screws.

Preferably, a grounding connector is connected to every one of the two casing parts. There is either one grounding connector connecting both casing parts or there are two grounding connectors which are electrically isolated from each other.

This embodiment allows to use an essentially prefabricated casing with the advantage that it is only preformed casing parts need to be connected on site. Further, there are no points where three parts need to be connected but everywhere only two: There is the connection between metal sheath of the cable and a casing part and the connection between the casing parts or one casing part and a casing tube. This enhances the reliability and speeds up the installation time.

A cable joint with only one grounding connector connecting both parts of the casing is sometimes called a straight-through joint.

If the two casing parts are connected to each other in an electrically conducting way, a straight-through joint can be realized without a grounding connector.

A cable joint with two, unconnected grounding connectors, one for each part of the metal casing is used in cross-bonding joints. Cross-bonding joints are preferably used where conductors carrying different phases of a high voltage current are joint in parallel and where metal sheaths belonging to cables carrying different phases are connected with each other.

In one embodiment, the casing tube comprises a plastic tube with an outer diameter essentially equal to the inner diameter of the two casing parts at their second opening. The two casing parts can be pushed onto the plastic tube. However, they are only pushed so far that they do not contact each other. Preferably, the two casing parts are fixed with screws to the plastic tube in this configuration. Then a water-proof, water-tight and insulating tape is wrapped around the casing tube and the casing parts in the region where they cover the casing tube. Thereby the casing tube is constructed and the water-tight connection between the casing tube and the two casing parts is established at the same time. In one embodiment, the plastic tube is made of PVC.

In one embodiment, the plastic tube is made of Polyoxymethylene, preferably POM-C. It was found that the use of this plastic results in repair joints which are mechanically particularly stable.

In one embodiment, the method comprises the following steps:

A protection box is placed around the stress control body covering the connection piece and/or a protection box is placed around the casing.

The protection box has such an extent that it touches the outer jackets of each of the two cable ends such that it establishes preferably a fluid-tight connection between the protection box and the outer jacket of every one of the cable ends.

The protection box is then filled with a casting compound which is liquid during filling.

The casting compound is afterwards cured such that it becomes a solid.

If there are two grounding connectors, the two grounding connectors extend outside of the protection box.

In one embodiment, the protection box comprises sealing means surrounding the openings which touch the outer jackets of the cable ends. By varying the thickness of the sealing means, many parts of the protection box can be used for high voltage polymer cables of different diameters and for joints connecting them.

The protection box is preferably made of a plastic. Preferably, the protection box is made of polyester and if there are sealing means, they are preferably made of foam.

The use of a protection box protects the joint from the environment and mechanical damages. Further, the protection box acts as mould for the casting compound. The casting compound is a further protection of the joint against mechanical damages. Further, it acts as water barrier to the joint and to the connected cable ends.

In one embodiment, polyurethane is used as casting compound.

As mentioned above, in some embodiments, wires or braids are directly contacted to or formed out of the metal sheaths of the cable ends and these wires or braids are connected with each other.

A cable screen can be formed by a net of conducting wires and/or the metal sheath of the cable. An example of such a net is the above mentioned net of copper wires. The wires of the net can for example be made of copper, aluminum or similar, conducting metals. The wires forming the net run preferably parallel to each other surrounding the longitudinal axis of the cable in a helix. A method according to this embodiment comprises the following steps:

At each of the two cable ends a metal sheath is exposed.

At least one, preferably 3 to 4, screen conductors are connected to the metal sheath and/or to the wires of a net of each of the cable ends. Preferably, the screen conductors are braided copper conductor bands. The regions where the screen conductors are connected to the metal sheath and/or the wires of the net are called screen conductor-connecting regions.

The stress control body, the screen conductors, the screen conductor-connecting region of both cable ends and the section of the two cable ends between the screen conductor-connecting regions are covered with a water barrier foil. The water barrier foil is preferably an aluminium foil, which is connected to the exposed metal sheaths of both cable ends.

Preferably, the water barrier foil is covered with a protection layer. The protection layer is preferably made of heat shrink tubing. The protection layer covers the region between and including part of the outer jackets of both cable ends.

According to a first version of this embodiment, the screen conductors connected to one cable end are the same as the screen conductors connected to the other cable end. According to a second version of this embodiment, the screen conductors connected to one cable end are electrically connected to the screen conductors which are connected to the other cable end.

In this embodiment, the two functions of the casing are replaced by the screen conductors and the water barrier foil: The grounding of the outer semiconductive layer is enabled by the screen conductors and the water barrier function is ensured by the water barrier foil. Consequently, there is no need for a casing in this embodiment. The resulting repair joint is therefore more compact.

Preferably, the connection between the metal sheath and/or the wires of the net and the screen conductors is realized as follows:

An inner layer of copper braiding can surround the metal sheath in the screen conductor-connecting region. Preferably, the inner layer of copper braiding surrounds the metal sheaths of both connected cable ends in the respective screen conductor-connecting regions, both exposed cable ends in-between and the stress control body.

A conducting protection tube, preferably made of copper or brass, can be placed either directly onto the metal sheath or onto the inner layer of copper braiding in the screen conductor-connecting region. The inner layer of copper braiding is preferably applied in the screen conductor-connecting region, if the outer diameter of the metal sheath is smaller than the inner diameter of the protection tube in order to fill this gap and to ensure a tight seat of the protection tube. The protection tube protects the soft metal sheath of the cable, which is often made of lead, from deformation and damages due to the fixing of the screen conductors.

If the cable end to be connected comprises a net beneath the metal sheath, the wires of this net are, during the preparation of the cable end, preferably exposed for a distance of about the length of the screen conductor-connecting region. These wires of the net are preferably folded back onto the protection tube. They are preferably fixed by a copper wire wrapped around the back-folded wires of the net in the region of the protection tube.

If there is an inner layer of copper braiding, the wires of the net are preferably guided through this inner layer of copper braiding such that the inner layer of the copper braiding surrounding the metal sheath and the inner layer of the copper braiding surrounding the exposed cable ends and the stress control body are in electric contact. Guiding the wires of the net through the inner layer of copper braiding can be done for example by using a tape to construct the inner layer of copper braiding and by running this tape between two parallel running wires of the net in the region where they are bent. Another possible way for guiding the wires of the net through the inner layer of copper braiding is to stick the wires of the net through the inner layer of copper braiding.

The screen conductors are preferably arranged on the copper wire fixing the back-folded wires of the net on the protection tube, if there is a net. The screen conductors are preferably arranged directly onto the protection tube if there is a protection tube but no net. The screen conductors are preferably arranged on the inner layer of the copper braiding if there is no protection tube. If there is neither an inner layer of copper braiding nor a protection tube, the screen conductors are preferably arranged directly on the metal sheath.

The screen conductors are preferably fixed by fixing means such as clamps or bands made for example of steel. The fixing means should have a high tensile strength to allow a tight and mechanically stable connection, while being electrically conducting at the same time.

Preferably, an outer layer of copper braiding surrounds the screen conductor-connecting region, the screen conductors and, if present, the inner layer of copper braiding.

Preferably, the inner layer of copper braiding, the screen conductors and the outer layer of copper braiding extend, if they exist, from one screen conductor-connecting region to the other and surround thereby the stress control body mounted on the connection piece.

Preferably, the inner and the outer layer of copper braiding are realised by wrapping a tape made of copper braiding. The screen conductors run essentially parallel to the longitudinal axis of the connected cable conductors, while following the outer shape of the stress relief body.

Preferably, this assembly is wrapped with a semiconducting tape. The water barrier foil is preferably applied on top of the semiconducting tape. Preferably the water barrier foil is applied in the form of rectangular pieces which are arranged in an overlapping way to ensure the desired fluid tightness. In one embodiment, the water barrier foil is applied in the form of a tape. Preferably the water barrier foil is an aluminium foil.

Preferably, a protection layer in the form of two overlapping heat shrink tubes is applied. A sealing tape can be arranged between parts of the outer jacket and the heat shrink tube in order to realise an improved a fluid tight connection between the protection layer and the heat shrink tube.

In a method of repairing or replacing a joint for high voltage polymer cables the step of removing the section to be replaced of the joint comprises the following steps:

If present, a protection box of the joint is removed.
If present, a casting compound of the joint is removed.
If present, a casing of the joint is removed. If present, a stress control body of the joint is removed.

A connector connecting the cable conductors in the joint is removed, preferably by cutting the cable conductors on both sides of the connector.

In a standard cable joint, a connector connects the cable conductors to be joined. The length of the connector is typically chosen to be as short as possible while still allowing a secure and electrically well conducting contact to both cable ends. It is in most cases the connector which fails, if a joint fails. However, even if the defect is located somewhere else in the joint, removal of the connector is preferred as the reliability is lowered if a connector and a connection piece are used together inside the same repair joint. In order to minimize the separation distance and thereby the region influenced by the method of repairing or replacing a joint, it is advantageous to remove everything surrounding the connector and to remove only the section of the joint which comprises the connector and, if there is one, the defect.

However, if it is unclear where exactly in the joint a defect occurred, has a high risk of occurring or if one suspects that there is more than one section with defects or high risks for them, simply removing the complete joint by cutting the cable before entering and after leaving the joint is preferred.

In a method of repairing or replacing a high voltage polymer cable the step of removing the section to be replaced of the high voltage polymer cable comprises the step of cutting the cable on both sides of the section to be replaced and removing the section to be replaced.

Preferably, the section to be replaced is chosen in such a way that if there are multiple defects or regions with a high risk for defects with distances of less than 1 m, preferably with less than 0.1 m, between each other, the section to be replaced comprises all of the defects or high risk regions. A high risk region is a region with a high risk for defects or with structures which make a replacement desirable.

Preferably, the section to be replaced begins more than 5 cm before the first end of the first defect or the first high risk region and end more than 5 cm behind the last end of the last defect or the last high risk region.

In one embodiment, a connection piece for connecting two cable conductors of high voltage polymer cables in a method of repairing or replacing a joint or a high voltage polymer cable comprises two receiving sections and a centre section. The length of the centre section is greater or equal to 10 cm. The length of the centre section corresponds to a separation distance between two cable ends to be connected.

In one embodiment, a connection piece for connection two cable conductors of high voltage polymer cables in a method of repairing or replacing a joint or a high voltage polymer cable comprises two receiving sections and a centre section. The centre section and at least one of the receiving sections are equipped with coupling means. The coupling means allow to establish a mechanical and electrically conducting connection between the at least one receiving section and the centre section. The length of the centre section is greater or equal to 10 cm. The length of the centre section corresponds to a separation distance between two cable ends to be connected.

Connectors used in common cable joints consist in most cases of one single piece. As they are typically short and as, during the first installation of a high voltage cable, the high voltage cable can be moved, connecting both cable conductors with such a single piece connector is not difficult. However, during a repair or replacement, the cable ends usually cannot be moved towards each other. The separation distance is given and the distance between the cable ends can only be increased by bending the cable ends slightly, if a further removal of intact cable should be avoided. As high voltage polymer cables are rather stiff, the bending radii are larger. As the center section of the connection piece has the length of the separation distance, it will be heavier than a common connector and more difficult to handle.

The separation distance is the shortest distance between the two cable ends.

A fault in a high voltage polymer cable or a joint for high voltage polymer cables is typically a discharge. Heat and delamination caused by the discharge also influence the material surrounding the defect. It was discovered, that the section to be removed which comprises the defect should have preferably a minimum length of 10 cm. Therefore the length of the center section of a connection piece especially well-suited for the inventive repair or replacement method is greater or equal to 10 cm.

Designing the connection piece in at least two parts which can be connected with coupling means facilitates the installation on site, as the cable conductors can be mounted in the receiving sections without any forces due to the bending or compression of the cable ends. Once the installation of the receiving sections on the cable conductors is done, the coupling between the center section and the receiving section can be realized. In many cases, the less flexible and heavy center section can essentially stay in place while the receiving section is moved in a position where the coupling is possible.

Therefore the connection piece at hand is especially well-suited for the inventive method for repairing or replacing high voltage devices.

However, by choosing suitable receiving sections, it is also possible to mount a connection piece without coupling means in a similar comfortable way: For example, the receiving sections can have the shape of tubes which are cut along their longitudinal axis in two halves. For connecting the cable conductors, the upper half of the receiving sections is taken off, leaving two tub-like regions connected by the center section. The cable conductors are placed inside the tub-like regions and afterwards the receiving sections are closed by bringing the upper halves of receiving sections in place to complete the tube shape again. The receiving sections are closed for example by screws which connect the two halves of each receiving section. Additional screws may be used to fix the cable conductors inside the receiving sections and to ensure a sufficient electric contact.

Other types of receiving sections are crimpable sleeves and tubes comprising screws pointing inwards which are used to fix the cable conductors inside the receiving sections and to ensure a sufficient electric contact. A connection piece can use any one of the different types of receiving sections, irrespective of the number and existence of coupling means.

In one embodiment, the coupling means of the connection piece are a threaded hole and a threaded bolt.

A coupling by threads establishes on the one hand a connection which is electrically well conducting if both parts are electrically well conducting. On the other hand, it can pull or push the sections of the connection piece from towards or away from each other. Especially the pulling force can be used to align the two cable ends in an easy way towards each other.

In one embodiment, the centre section comprises two or more centre section pieces which are all equipped with coupling means to establish a mechanical and electrically conducting connection.

Such a modular system of the center section has the advantage that the length of the center section can easily be adapted, even on the field. It allows to produce a center section with the length of the separation distance on the field after the section to be removed of the cable or the joint was actually removed. Therefore, the persons doing the repair or replacement are free to choose the length of the section to be removed once they see the situation without the need to bring a large number of possible center sections of different lengths with them. Finally, the center section pieces are smaller and therefore lighter and easier to handle compared to a single piece center section.

In one embodiment, the connection piece comprises two receiving sections equipped with coupling means in the form of threads. The handedness of the threads of the two receiving sections is different from each other. The centre section comprises a central piece. In addition, the centre section comprises preferably one or more adapter pieces. The central piece comprises two threads of different handedness. If there are adapter pieces, each adapter piece comprises two threads with same handedness.

This embodiment works similar to a turnbuckle. However, in the case at hand the main advantage is, that it is a simple mechanism which allows that none of receiving sections need to rotate to fasten the coupling means. Only the central piece and, if present, adapter pieces are rotated around their longitudinal axis in other to close the coupling system.

If there are any adapter pieces, the central piece and the adapter pieces are all centre section pieces. Therefore the embodiment comprising a central piece and adapter pieces combines the advantages of avoiding a rotation of the receiving sections in a mechanically easy way with the flexibility of the modular system described above.

In another embodiment, the central piece of the center section is screw-nut like and either one or more of the adapter pieces or at least one of the receiving sections comprises a matching thread on its outer surface. The length of the central piece and the length of the matching thread are adapted such that the threads of the central piece and the matching thread can establish a coupling between the receiving sections.

This embodiment is another a simple mechanism to allow that none of receiving sections needs to rotate to fasten the coupling means, but only the central piece and, if present, adapter pieces.

If there are any adapter pieces, the central piece and the adapter pieces are all centre section pieces. Therefore the embodiment comprising a central piece and adapter pieces combines the advantages of avoiding a rotation of the receiving sections in a mechanically easy way with the flexibility of a modular system described above.

Further, this embodiment can be realized in such a way that the central piece can be placed in an installation position onto an adapter piece or a receiving section during the installation of the receiving sections and the adapter pieces. In this installation position, it does not contribute to the length of the central piece. Once all adapter pieces and receiving sections are arranged relative to each other, the central piece is then screwed in its coupling position, where it couples the two receiving sections. Thereby the forces on and the bending of the cable ends can be minimized.

A high voltage cable repair joint comprises a connection piece for connection two cable conductors of high voltage polymer cables in a method of repairing or replacing a joint or a high voltage polymer cable and a stress relief body. The stress relief body comprises two deflectors and one shield electrode. The shield electrode has a length of more than 20 cm and a length which is greater than the length of the connection piece.

The shield electrode is, during operation of the high voltage cable repair joint, on the voltage potential of the cable conductors. Therefore, there is an electric field free volume in its inside. As a consequence, small voids acceptable in the region of the connection piece which is located during operation inside the shield electrode. This facilitates the use of coupling means in the connection piece.

The shield electrode is preferably a homogeneous or an inhomogeneous shield electrode.

As the center section of the connection piece has a length of more than 10 cm and as the shield electrode should cover in addition also the receiving sections of the connection piece and touch the insulating layers of the cable ends, a length of more than 20 cm is preferred.

In one embodiment, the high voltage cable repair joint comprises a casing with a length of about twice the length of the stress relief body.

The stress relief body is preferably prefabricated. In order to ensure a tight seat of the stress relief body on the insulating layer and on the outer semiconducting layer of the cable ends, it is preferred, that the stress relief body is, during installation, slipped on the outer semiconducting layer of one of the cable ends in a parking position. Therefore, all layers outside of the semiconducting layer are removed in the region of the cable end which is used as parking position. One of the layers which is removed is the metal sheath and preferably a copper net below the metal sheath. However, the metal sheath and, if present, the copper net are used to shield the cable and to restrict the electric field to its inside and they are one possible contact for grounding the outer semiconducting layer. Further, the metal sheath is a water barrier. This water barrier function as well as the grounding of the outer semiconducting layer are taken over by the casing in the region where the metal sheath of the cable ends is removed. Consequently, the casing is supposed to enclose the parts of the cable ends without metal sheath and the whole connection piece.

In one embodiment the high voltage cable repair joint comprises a casing with a length of about twice the length of the stress relief body and a centering device.

The centering device is made of electrically insulating material. The centering device is located inside the casing. The centering device is located between one end of the casing and the stress relief body. The centering device comprises a duct to receive a high voltage polymer cable. The centering device has an outer diameter which equals the inner diameter of the casing. Thereby the centering device can support a high voltage polymer cable to run along a longitudinal axis of the casing.

As the connection piece is longer then a connector, the stress relief body of the repair joint has a greater length than a stress relief body of a common joint. This requires in many cases that the casing can have a length where a cable placed inside it starts to sag. A sagging cable causes one-sided loads on the casing and on the stress relief body. In order to increase the reliability, it is therefore preferred that the cable is protected against sagging by the use of a centering device.

Preferably, the centering device is made of rubber tape which is electrically insulating and wound around the cable. In another embodiment, the centering device is made of a hollow cylinder made of plastic. In one preferred embodiment, the wall of the centering device in the shape of a hollow cylinder is not solid but comprises radially extending ribs.

Besides supporting the cable, the centering device stabilizes the casing from the inside. This allows to reduce the wall thickness of the casing, making it lighter and more cost efficient.

In one embodiment, a high voltage cable repair joint comprises a connection piece, a stress relief body, comprising two deflectors and a shield electrode as well as one or more screen conductors and a layer made of water barrier foil. The screen conductors are preferably braided copper conductor bands. The layer made of water barrier foil surrounds the stress relief body and the screen conductors. The length of the shield electrode is greater than the length of the connection piece and greater than 20 cm.

The screen conductors run preferably essentially parallel to the longitudinal axis of the connected cable conductors while following the outer contour of the stress relief body.

The invention at hand comprises also the use of a connection piece in the method of repairing or replacing a joint for high voltage polymer cables or a high voltage polymer cable according to the invention. The connection piece comprises two receiving sections and a centre section. The centre section has a length corresponding to a separation distance between two cable ends.

The invention at hand comprises also the use of a stress control body in the method of repairing or replacing a joint for high voltage polymer cables or a high voltage polymer cable according to the invention. The stress control body comprises two deflectors and a shield electrode. The length of the shield electrode is greater than the length of the connection piece.

Other advantageous embodiments and combinations of features come out from the detailed description below and the entirety of the claims.

The drawings used to explain the embodiments show:

FIG. 1b A sketch indicating the cuts necessary to remove the section to be replaced of the faulty high voltage polymer cable FIG. 1c The two cable ends with exposed cable conductors FIG. 1d The connection piece with two receiving sections and a centre section FIG. 1e The two cable ends connected with the connection piece FIG. 2a A faulty joint for high voltage polymer cables FIG. 2b A sketch indicating the cuts necessary to remove the section to be removed of the faulty joint FIG. 2c The two cable ends with exposed cable conductors FIG. 2d The connection piece with two receiving sections and a centre section FIG. 2e The two cable ends connected with the connection piece FIG. 3a A connection piece with coupling means in the form of threads on one of the receiving sections and on the centre section FIG. 3b A first embodiment of a connection piece with a centre section comprising centre section pieces in the form of one central piece and two adapter pieces.

FIG. 7a A second repair joint of the straight-through type

FIG. 7b A close-up of the screen conductor-connecting region of the second repair joint shown in FIG. 7a FIG. 8 A stress control body with an inhomogeneous shield electrode In the figures, the same components are given the same reference symbols.

Figure 1A:
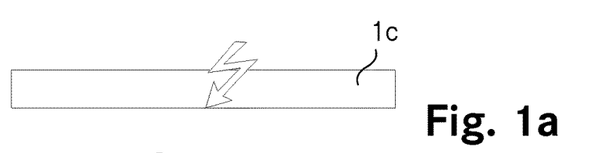
FIG. 1a A faulty high voltage polymer cable
Figures 1B, 1C:
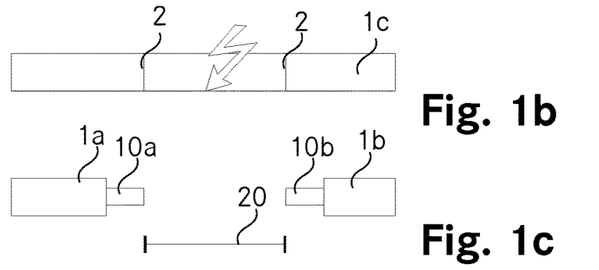
Figure 1D:
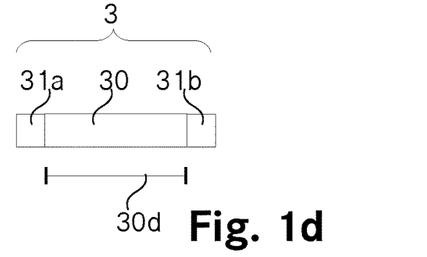
Figure 1E:
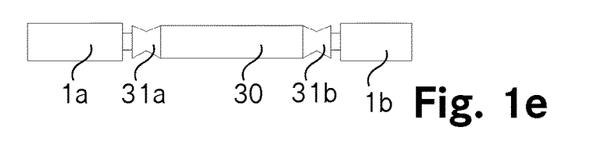

FIGS. 1a to 1d illustrate the method to repair a faulty high voltage polymer cable 1c. The method to replace a part of a high voltage polymer cable is analogue to the one depicted here with the only difference, that there is no defect but another reason for a local replacement. FIG. 1a shows a sketch of the faulty high voltage polymer cable 1c. The place where the defect occurred is marked by a thunderbolt. FIG. 1b illustrates that the faulty high voltage polymer cable 1c is cut 2 before and behind the defect. The section to be replaced of the faulty high voltage polymer cable 1c is the part between the two cuts 2. This section to be replaced is removed. Two cable ends 1a and 1b remain and they are shown in FIG. 1c. The cable conductors 10a and 10b of the two cable ends 1a and 1b are exposed. The distance between the two cable ends 1a and 1b is the separation distance 20. FIG. 1d shown a connection piece 3. It is made of an electrically conducting material such as copper or a copper alloy. The connection piece 3 has two receiving sections 31a and 31b and a centre section 30 in between. The centre section 30 has the shape of a cylinder. The two receiving sections 31a and 31b have the shape of hollow cylinders. The length of the centre section 30d equals the separation distance 20. In FIG. 1e, the connection piece 3 is used to connect the two cable conductors 10a and 10b of the two cable ends 1a and 1b. The cable conductors 10a and 10b are placed inside the two receiving sections 31a and 31b and fixed by crimping to them. An electrically conducting connection is established by the connection piece 3 which replaces the section to be replaced and therefore the high voltage polymer cable is repaired.

Figure 2A:
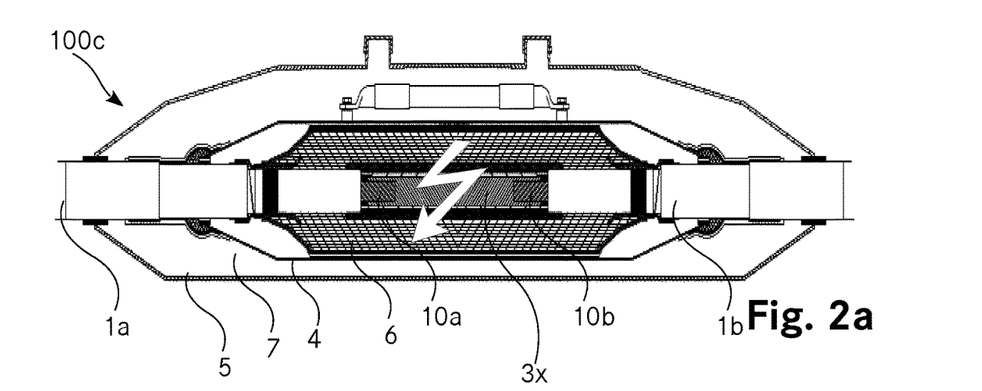

FIGS. 2a to 2e illustrate the method to repair a faulty joint for high voltage polymer cables 100c. Again, a similar method can be used to replace a joint with the only difference that there is no defect. FIG. 2a depicts the faulty joint 100c. The faulty joint 100c comprises a protection box 5, a casing 4 and a stress control body 6 and a connector 3x. The connector 3x connects two cable conductors 10a and 10b of two cable ends 1a and 1b. The stress control body 6 is arranged around the connector 3x. A casing 4 encloses the stress control body 6. The protection box 5 encloses the casing 4. A cast material 7 fills the volume between the protection box 5 and the casing 4. The faulty joint 100c has a defect marked with a thunderbolt. The defect is located at the connector 3x.

Figures 2B, 2D:
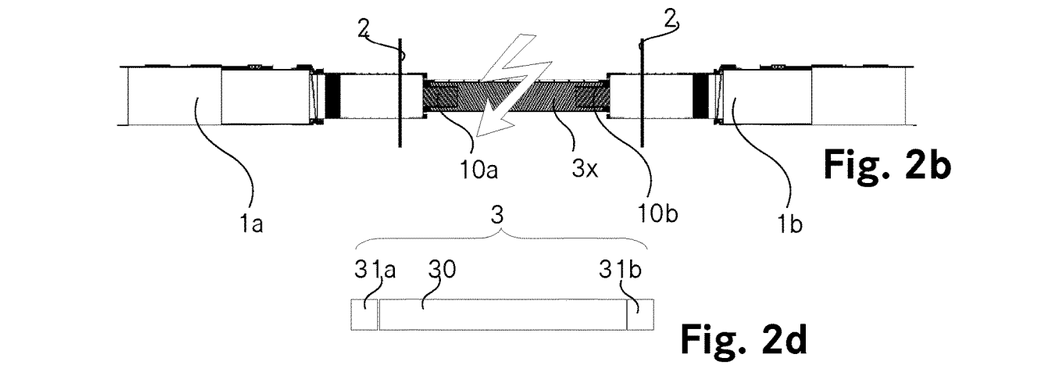

FIG. 2b shows the situation after the removal of the protection box 5, the cast material 7, the casing 4 and the stress control body 6. There are two cable ends 1a and 1b with two cable conductors 10a and 10b connected with a connector 3x. The connector 3x is faulty. Both cable ends 1a and 1b are cut 2 at a place close to the connector 3x but before the cable conductors 10a and 10b enter the connector 3x. The section between the two cuts 2 is the section to be replaced. The section to be replaced is removed.

Figure 2C:
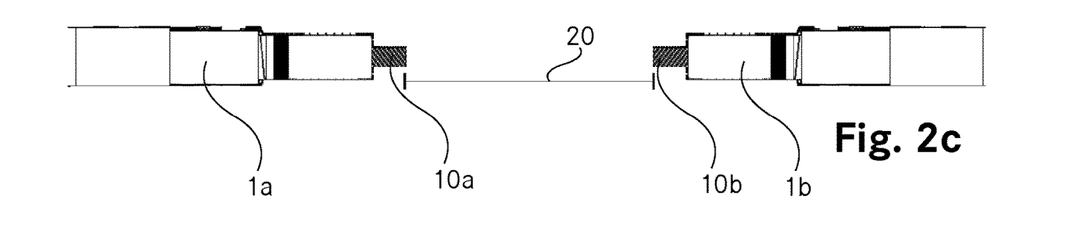

FIG. 2c depicts the situation after the removal of the section to be replaced and after exposing the cable conductors 10a and 10b again. There is now a separation distance 20 between the two cable ends 1a and 1b.

FIG. 2d shows the connection piece 3. It comprises a centre section 30 and two receiving section 31a and 31b. It is similar to the connection pieces shown in FIG. 1d which the only exception being the length of the centre section 30: The length of the centre section 30 of the connection piece 3 shown in FIG. 2d equals the separation distance 20 shown in FIG. 2c. Further, the receiving sections 31a and 31b are equipped with threads of opposite handedness on their inside.

Figure 2E:
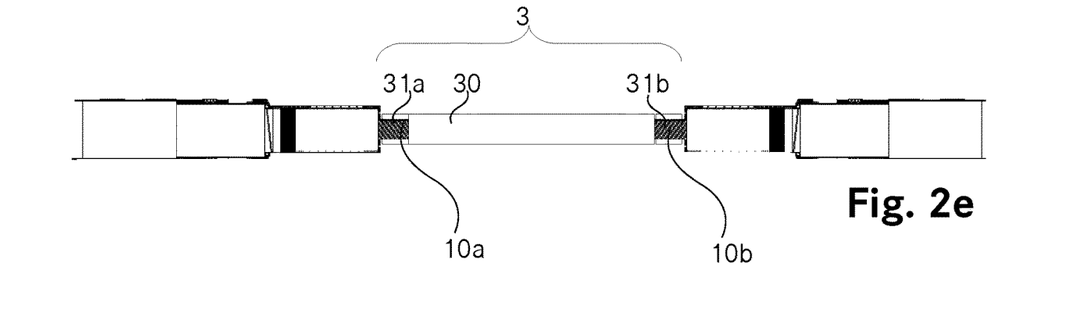

FIG. 2e shows the cable ends 1a and 1b connected with the connection piece 3. End caps comprising threads matching the ones of the receiving sections 31a and 31b are mounted onto the cable conductors 10a and 10b. The connection piece 3 is placed between the two cable ends 1a and 1b and was fixed to the cable conductors by rotating is around its longitudinal axis and thereby screwing it onto the cable conductors 10a and 10b.

Figure 3A:
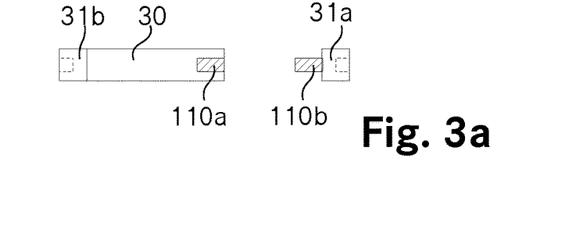

FIG. 3a shows a connection piece 3 which consists of a centre section 30 and a receiving section 31a with coupling means. The coupling means on the centre section 30 has the form of a threaded hole 110a and the receiving section 31a has a coupling mean in the form a threaded bolt 110b. The receiving section 31b and the centre section 30 form one integral part. The threaded bolt 110b can be screwed into the threaded hole 110a and thereby the receiving section 31a can be coupled to the centre section 30.

Figure 3B:
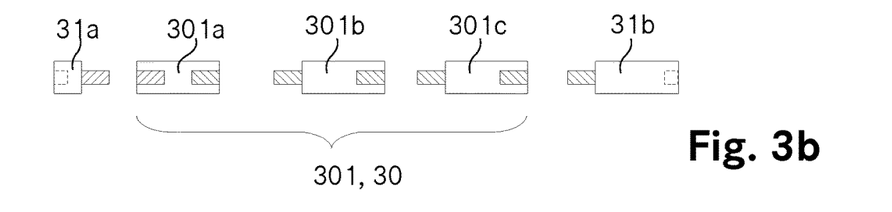

FIG. 3b depicts a first embodiment of a connection piece 3 with a centre section 30 comprising centre section pieces 301 in the form of one central piece 301a and two adapter pieces 301b, 301c. In this embodiment, the two adapter pieces 301b and 301c are both equipped with a threaded bolt and a threaded hole. The two receiving sections 31a and 31b are both equipped with a threaded bolt. The central piece 301a is equipped with two threaded holes. The handedness of the threaded holes of the central piece 301a is different from each other. Also the threaded bolts of the two receiving sections 31a and 31b differ in their handedness. All threads located on one adapter piece 301b or 301c have the same handedness. In the embodiment shown in FIG. 3b, the threads on all adapter pieces 301b and 301c have the same handedness. Due to the different handedness of the threads in the central piece 301a and of the threads of the receiving sections 31a and 31b, rotating the central piece 301a around its longitudinal axis tightens or loosens the connection to both receiving sections 31a and 31b simultaneously. The adapter pieces 301b and 301c are designed in such a way that more, similar adapter pieces can be added to make the centre section 30 longer or they can be omitted to shorten the centre section 30.

Figure 3C:
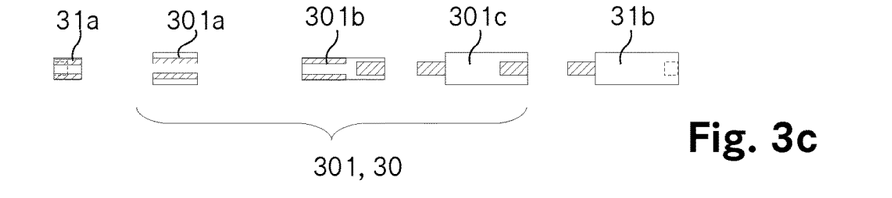
FIG. 3c A second embodiment of a connection piece with a centre section comprising centre section pieces in the form of one central piece and two adapter pieces.

FIG. 3c depicts a second embodiment of a connection piece 3 with a centre section 30 comprising centre section pieces 301 in the form of one central piece 301a and two adapter pieces 301b and 301c. In this embodiment, all threads have the same handedness. The receiving section 31a is equipped with a threaded outer surface. The central piece 301a has the shape of a hollow cylinder with a threaded inner surface. The inner diameter of the central piece 301a and the outer diameter of the receiving section 31a as well as their threads are designed in such a way that the central piece 301a can be screwed onto the receiving section 31a. The adapter piece 301b has an outer surface which comprises partially a thread and a threaded hole. The outer diameter of the adapter piece 301b is such that the central piece 301a can be screwed onto its threaded part and slipped over the part without threaded surface. The adapter piece 301c comprises a threaded bolt and a threaded hole. The receiving section 31b comprises a threated bolt.

This second embodiment can be mounted as follows on the two cable ends: The central piece 301a is screwed onto the adapter piece 301b such that it does not extend over the adapter piece 301b on any end of it. The receiving ends 31a and 31b are mounted onto the cable conductors of the cables to be connected. A suitable number of adapter pieces similar to 301c are screwed onto the receiving end 31b. The adapter piece 301b is screwed onto the other adapter pieces 301c, or if none was needed, directly onto the receiving end 31b. In this situation, the separation distance between the two cable ends is essentially filled with parts of the centre section 30. In this situation, the central piece 301a is screwed off the adapter piece 301b and at the same time screwed onto the receiving section 31a. Thereby, the connection piece 3 becomes one electrically well conducting part with a centre section 30 of the desired length.

Figure 4:
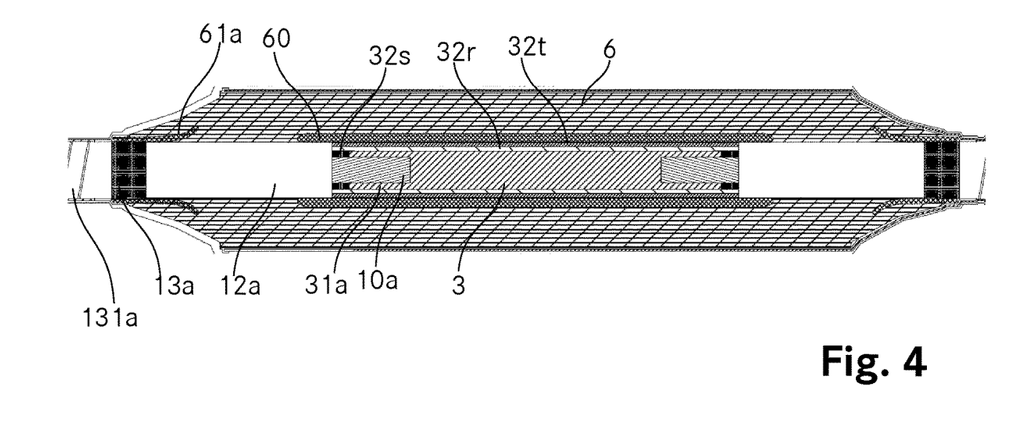
FIG. 4 A simple repair joint

FIG. 4 shows a simple repair joint 100. This joint 100 is symmetric and therefore only the connection of the first cable end 1a is described. The second cable end and its connection is analogue.

The conductor 10a of the first cable end 1a is exposed over a first length. This is followed by a section in which the insulating layer 12a of the first cable end 1a is exposed over a second length. This is followed by a section in which the outer semiconducting layer 13a of the first cable end 1a is exposed over a third length. This is followed by a section in which the outer semiconducting layer 13a of the first cable end 1a is wrapped with electrically conducting tape followed by electrically insulating tape to create an enhanced outer semiconducting layer 131a.

There is further a connection piece 3. It has two receiving sections. The receiving section is slightly shorter than the first length over which the cable conductor 10a of the first cable end 1a is exposed. The cable conductor 10a is placed inside the receiving section. There is a short distance between the insulating layer 12a and the connection piece 3. This distance is filled with a semiconducting filling tape 32s such that outer diameter of this filled section equals the outer diameter of the connection piece 3. The outer diameter of the connection piece 3 is smaller than the outer diameter of the insulating layer 12a of the cable ends 1a. A filling tube 32t is placed between the ends of the insulating layers 12a, 12b of the two cable ends 1a and 1b. The outer diameter of the filling tube 32t equals the outer diameter of the insulating layer 12a and 12b. The space between the filling tube 32t and the connection piece 3 or the semiconducting filling tape 32s is filled with conducting filling tape 32r.

A stress control body 6 surrounds this setup. The stress control body 6 has the shape of a hollow cylinder with two outwardly tampering ends. The stress control body 6 comprises a shield electrode 60 and two deflectors 61a and 61b. The shield electrode 60 and the two deflectors 61a and 61b are made of semiconducting material such a silicone rubber with carbon black particles. The rest of the stress control body 6 is made of electrically insulating material such a silicone rubber. The shield electrode 60 has the shape of a tube with rounded edges. Its length is greater than the distance between the ends of the insulating layers 12a, 12b of the two cable ends 1a and 1b. The shield electrode 60 contacts and covers the filling tube 32t and is therefore, during operation, on the high voltage potential of the cable conductors 10a, 10b. The deflectors 61a have the shape of round cones with their smaller diameter pointing outwards. In the region of their smallest diameter, the deflectors 61a, 61bc contact the outer semiconducting layers 13a, 13b of the two cable ends. The deflectors 61a, 61b are located at the ends of the stress control body 6. Outside of the stress control body 6, there is the enhanced outer semiconducting layer 131a. The enhanced outer semiconducting layer 131a ensures a reliable grounding of the outer semiconducting layer 13a and the deflector 61a via the metal sheath of the cable. The metal sheath of the cable is not shown in this Figure.

The stress control body 6 is in one embodiment covered with an electrically conducting or semiconducting layer which is also grounded. This ensures that the electric field is restricted to the inside of the stress control body 6.

Figure 5:
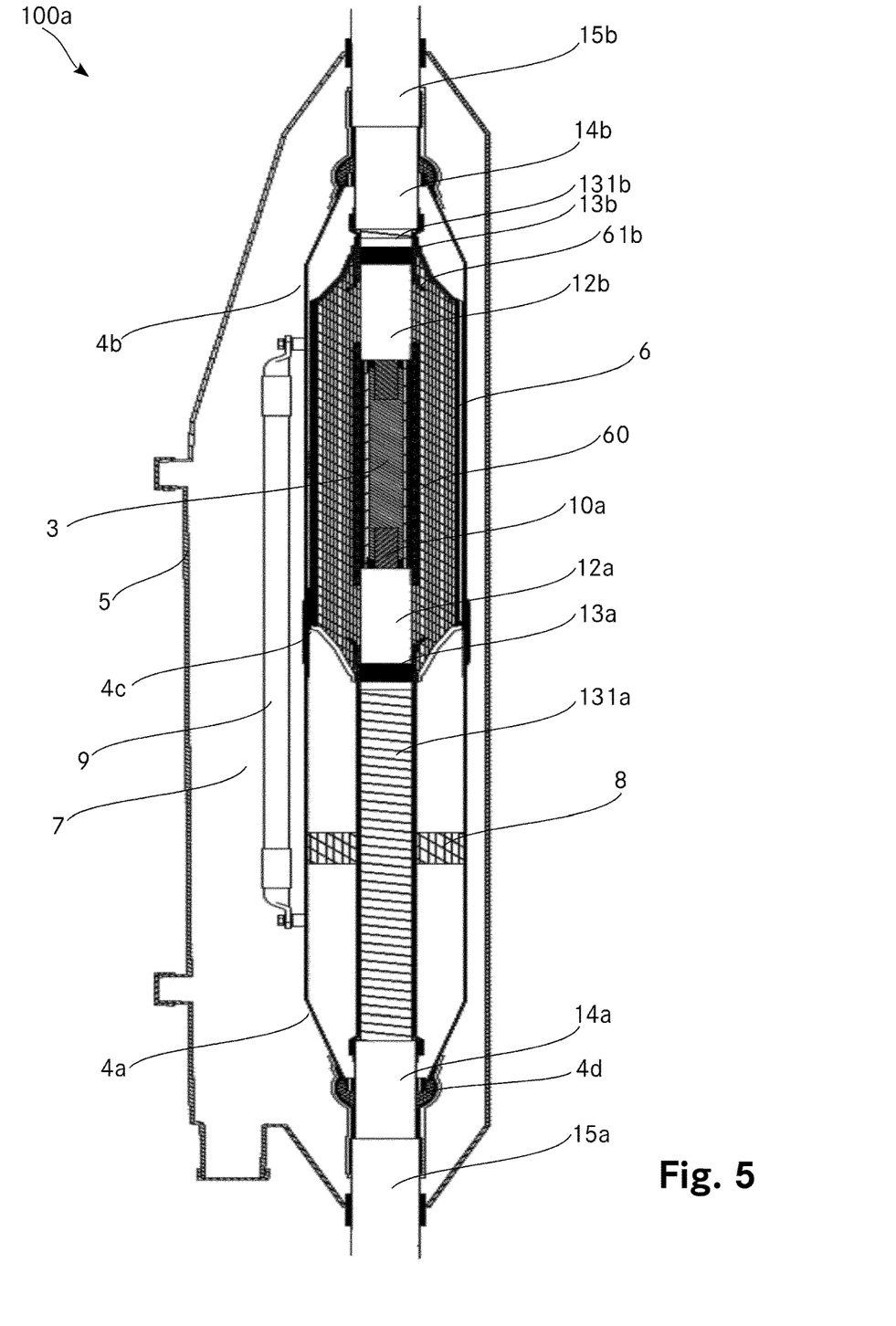
FIG. 5 A first repair joint of the straight-through type

FIG. 5 shows a first repair joint of the straight-through type 100a.

The inner part resembles the simple repair joint described and shown in FIG. 4.

The FIG. 5 shows more of the cable ends 1a and 1b than FIG. 4. The section with the enhanced outer semiconducting layer 131a is followed by a section where the metal sheath 14a, 14b is exposed. Further away from the connection piece 3, both cable ends 1a, 1b have their outer jacket 15a, 15b.

On the first cable end 1a, the section with the enhanced outer semiconducting layer 131a is approximately as long as the stress control body 6. On the second cable end 1b, the section with the enhanced outer semiconducting layer 131b is much shorter with a length similar to the length over which the outer semiconducting layer 13b is exposed.

A centering device 8 is placed around the first cable end 1a, in the middle of the section with the enhanced outer semiconducting layer 131a.

A casing 4 encloses the volume which comprises both enhanced outer semiconducting layers 131a and 131b, the stress control body 6 and the centering device 8. The casing comprises a first and a second casing part 4a and 4b as well as a casing tube 4c. The first and the second casing part 4a and 4b are connected with a seal 4d to the metal sheaths 14a and 14b of the cables ends 1a and 1b respectively. The casing parts 4a and 4b are made of metal, preferably of copper. They are connected with the casing tube 4c in a fluid-tight and electrically insulating manner. The seal 4d established a fluid tight and electrically conducting connection between the metal sheath of a cable end and the casing part mounted to it.

The two casing parts 4a and 4b are connected by a grounding connector 9 in an electrically conducting way.

The casing 4 with its seals 4d and the grounding connector 9 are enclosed by a protection box 5. The protection box 5 is made of plastic. It surrounds the outer jacket 15a and 15b of both cable ends 1a and 1b.

The volume between the casing 4 and the protection box 5 is filled with casting compound 7 which becomes solid after casting and protects the inner parts of the joint from mechanical damages and water.

Figure 6:
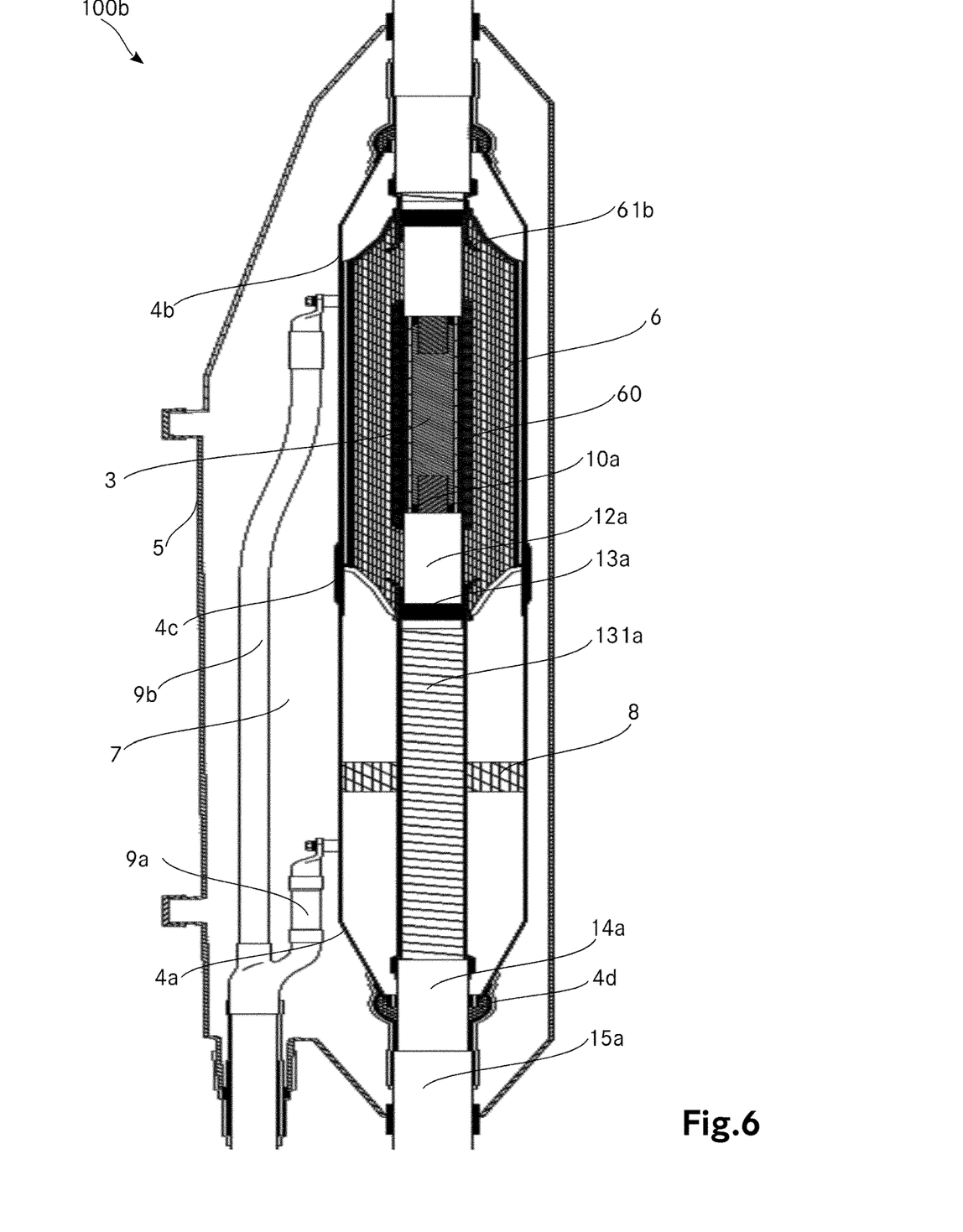
FIG. 6 A repair joint of the cross-linked type

FIG. 6 discloses a repair joint of the cross-linked type 100b. It resembles the repair joint of the straight-through type 100a shown in FIG. 5. The two types differ in the arrangement of the grounding connectors 9, 9a, 9b: In FIG. 5, there was only one grounding connector 9 which establishes an electrically connection between the two casing parts 4a and 4b.

In FIG. 6 however, a first grounding connector 9a is connected to the first casing part 4a and a second grounding connector 9b is connected to the second casing part 4b. Both grounding connectors, 9a and 9b, extend outside of the protection box 5. Therefore only part of them is enclosed by the casting compound 7.

Figures 7A, 7B, 8:
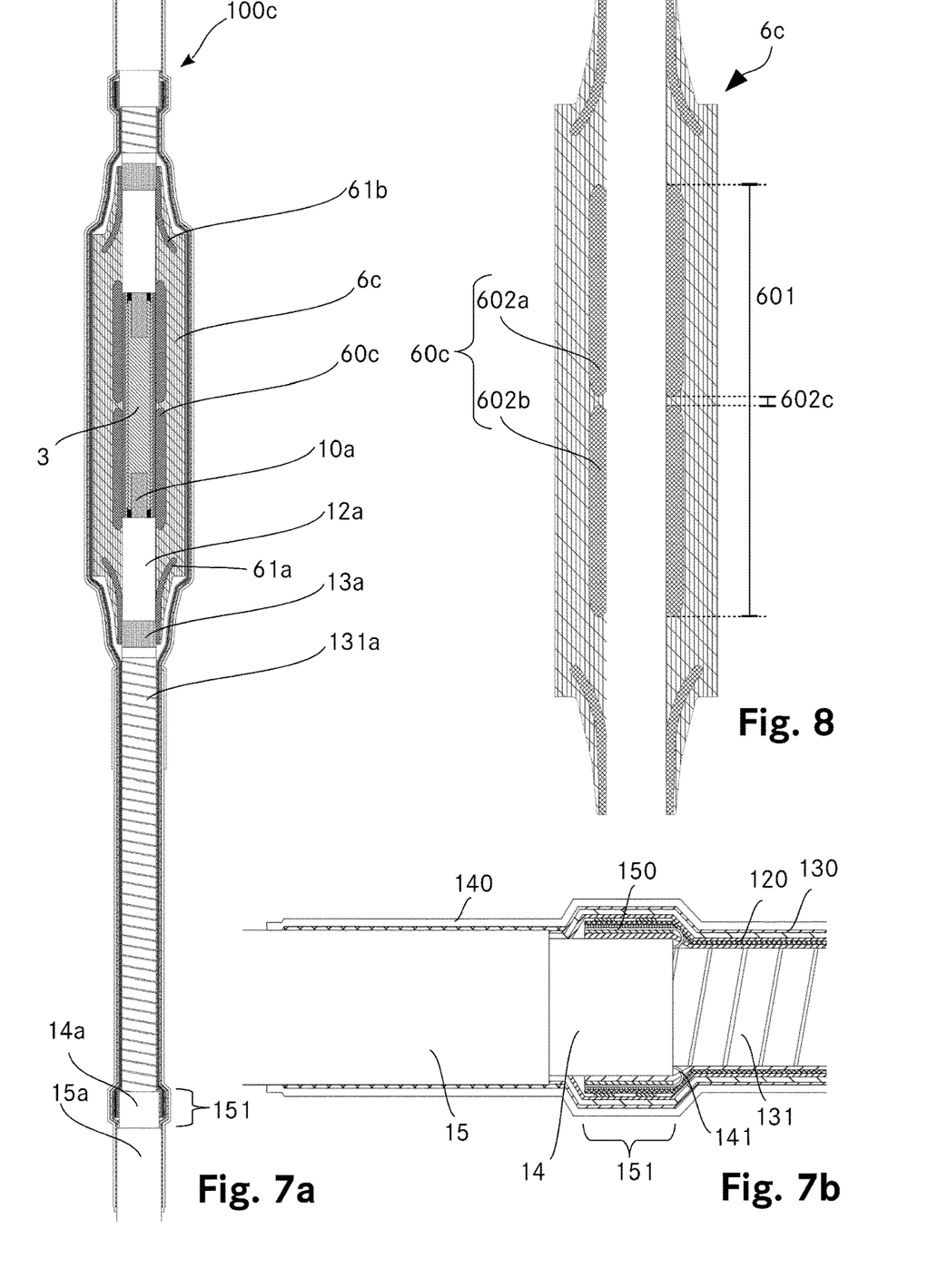

FIG. 7a shows a second repair joint of the straight-through type 100c and FIG. 7b shows a close-up of the screen conductor-connecting region 151 of this second repair joint 100c.

The innermost part of the second repair joint 100c is essentially the same as the innermost part of the first straight-though repair joint 100a and the cross-bonding type 100b. The innermost part comprises the connection part 3, the stress control body 6 and the way the cable ends are prepared. The following description focuses therefore on the outer part, which distinguishes the first and the second repair joint.

In the second repair joint, the two functions of the casing 4 are replaced by the screen conductors 120 and the water barrier foil 130: The grounding of the outer semiconductive layer 13 is enabled by the screen conductors 120 and the water barrier function is ensured by the water barrier foil 130. Consequently, there is no casing 4 needed or shown in this embodiment.

FIGS. 7a and 7b show the situation of cables comprising copper wires forming a net 141 beneath the metal sheath 14 being connected.

The connection between the metal sheath 14 of the cable and the wires of the net 141 and the screen conductors 120 is realized as follows:

An inner layer of copper braiding surrounds the metal sheath 14 in the screen conductor-connecting region 151. In this region, the inner layer of copper braiding fills the distance between the metal sheath 14 and the protection tube 150. The protection tube 150 is made of brass and protects the soft metal sheath 14 of the cable, which is often made of lead, from deformation and damages due to the fixing of the screen conductors 120.

The wires of the net 141 are in the unprepared cable beneath the metal sheath 14 in the shown embodiment. During the preparation of the cable end, the wires of the net 141 are exposed for a distance of about the length of the screen conductor-connecting region 151. After the installation of the protection tube 150 the exposed wires of the net 141 are folded back onto the protection tube 150.

The back-folded wires of the net 141 are fixed by a copper wire wrapped around them.

In this case the wires of the net 141 are guided through the inner layer of copper braiding by using a tape to construct the inner layer of copper braiding and by running this tape between two parallel running wires of the net 141 in the region where they are bent The screen conductors 120 are arranged on the copper wire fixing the back-folded wires of the net 141. The number of screen conductors 120 depends on the conducting cross-section needed in the application at hand. Typically, three screen conductors 120 are used. The screen conductors 120 are evenly distributed around the circumference of the wrapped protection tube 150.

The screen conductors 120 are fixed in the screen conductor-connecting region 151 by fixing means in the form of steel clamps. The clamps press the screen conductors 120 onto the protection tube 150 and the wires surrounding it.

Thereby, a good electric and mechanical contact between the wires of the net 141, the protection tube 150 and the screen conductors 120 is ensured.

The same screen conductors 120 are fixed in the same way in both screen conductor-connecting regions 151. Thereby, a good electric contact is established between the metal sheaths 15 and the nets of the two connected cable ends. In another embodiment, the same number of screen conductors 120 are fixed on both cable ends and each of the screen conductors 120 connected to one cable end is connected to one of the screen conductors 120 connected to the other cable end in such a way that a good electric contact is established.

An outer layer of copper braiding surrounds the screen conductor-connecting region 151, the screen conductors 120 and the inner layer of the copper braiding.

The inner layer of copper braiding, the screen conductors 120 and the outer layer of copper braiding extend from one screen conductor-connecting region 151 to the other and surround in between the stress control body 6 mounted on the connection piece 3. In the embodiment of FIG. 7a, the outer layer of copper braiding covers the screen conductor-connecting region 151.

The inner and the outer layer of copper braiding are realised by wrapping braided copper around the inner structures. The screen conductors 120 run essentially parallel to the longitudinal axis of the connected cable conductors but follow the outer shape of the stress control body 6.

The resulting assembly is wrapped with a semiconducting tape. The water barrier foil 130 is applied on top of the semiconducting tape. In this embodiment, the water barrier foil 130 is applied in the form of rectangular pieces of an aluminium foil which are arranged in an overlapping way to ensure the desired fluid tightness. In another embodiment, an aluminium tape is wrapped in an overlaying manner onto the semiconducting tape and forms the water barrier foil 130.

The outermost layer is a protection layer 140 in the form of two overlapping heat shrink tubes. A sealing tape is arranged between parts of the outer jacket 15 and the heat shrink tube in order to ensure a fluid tight connection between the protection layer 140 and the outer jacket 15 of the cables.

FIG. 8 shows a stress control body 6c with an inhomogeneous shield electrode 60c. This stress control body 6c can replace the stress control body 6 comprising a homogeneous shield electrode 60 as shown for example in FIG. 4. The inhomogeneous shield electrode 60c comprises two semiconducting regions 602a, 602b which have both the shape of circular tubes with rounded ends and which are both homogeneously semiconducting. They have the same diameter and the same length. The two semiconducting regions 602a, 602b are arranged in a distance 602c of less than 10 mm, in this case, they are arranged in a distance 602c of 5 mm. Both semiconducting regions 602a, 602b are arranged in such a way that they will contact the same connection piece 3 respectively the same filling once the stress control body 6c is mounted in the finished repair joint. Therefore, they will be on the same electric potential even though they are separated by insulating material.

The resulting inhomogeneous shield electrode 60c has the shape of the convex hull of the two semiconducting regions 602a, 602b and this is in the case at hand a circular tube with rounded ends having a diameter equal to the diameter of the semiconducting regions 602a,b and a length 601 equal to the sum of the lengths of the two semiconducting regions and the distance 602c between them.

The remaining features of the stress control body 6c are the same as in the stress control body 6 described above.

In summary, it is to be noted that the different types of connection pieces can be used in the different types of repair joints. Further, different ways to connect cable conductors to receiving sections can be used in different types of connection pieces. It is possible to omit the protection box. It is also possible to omit the casting compound. Instead of using an enhanced outer semiconducting layer, the metal sheath can extend further inside the casing. It is also possible that the enhanced outer semiconducting layer is omitted and the semiconducting layer is exposed in this region or that the semiconducting layer is wrapped with a conducting or semiconducting tape. It is possible that the region of the enhanced outer semiconducting layer is of the same length on both cable ends. In this case, the casing and the protection box can be shorter.

The connection piece can use coupling means different than threads, for example a clip system or an interlocking tongue-and-groove system. Different types of coupling means can be used in a connection piece.

The invention claimed is:

1. A connection piece for connecting two cable conductors of high voltage polymer cables in a method of repairing or replacing a joint of a high voltage polymer cable, the connection piece comprising two receiving sections and a centre section, the two receiving sections being releasably connected to the centre section by means of a threaded connection allowing to establish a mechanical and electrically conducting connection between each of the receiving sections and the centre section-, each of the receiving sections having a bore for receiving an end of one of the two cable conductors therein, the centre section being in the form of a full cylinder with a length which is greater or equal to 10 cm and which corresponds to a separation distance between the two cable ends to be connected, wherein the handedness of the threads of the two receiving sections is different from each other and wherein the centre section comprises at least one central piece comprising two threads of different handedness.

2. The connection piece according to claim 1, wherein the threaded connection is in the form of a threaded hole and a threaded bolt.

3. The connection piece according to claim 1, wherein the centre section comprises one central piece and at least one adapter piece, the at least one adapter piece comprising two threads of the same handedness.

* * * * *